US010085164B2

(12) United States Patent
Chen et al.

(10) Patent No.: US 10,085,164 B2
(45) Date of Patent: Sep. 25, 2018

(54) SYSTEM AND METHOD FOR MANAGING INVALID REFERENCE SUBFRAMES FOR CHANNEL STATE INFORMATION FEEDBACK

(75) Inventors: Wanshi Chen, San Diego, CA (US); Peter Gaal, San Diego, CA (US); Juan Montojo, San Diego, CA (US); Jelena M. Damnjanovic, Del Mar, CA (US)

(73) Assignee: Qualcomm Incorporated, San Diego, CA (US)

( * ) Notice: Subject to any disclaimer, the term of this patent is extended or adjusted under 35 U.S.C. 154(b) by 162 days.

(21) Appl. No.: 13/455,025

(22) Filed: Apr. 24, 2012

(65) Prior Publication Data
US 2012/0275398 A1 Nov. 1, 2012

Related U.S. Application Data

(60) Provisional application No. 61/480,284, filed on Apr. 28, 2011.

(51) Int. Cl.
*H04W 24/10* (2009.01)

(52) U.S. Cl.
CPC .................. *H04W 24/10* (2013.01)

(58) Field of Classification Search
CPC ..... H04W 24/00; H04W 74/00; H04W 52/00; H04W 28/04; H04W 76/048; H04W 24/10; H04W 72/0413; H04W 72/082; H04W 72/1226; H04W 72/1231; H04L 1/00; H04L 5/001; H04L 5/0057; H04L 1/0026; H04L 1/1671; H04B 15/00; H04B 7/0632; H04B 17/24

USPC ....... 370/329, 252, 328, 311, 230, 241, 332; 455/437, 452.1, 501, 67.11, 115.1, 132, 455/133, 134, 135, 226.1
See application file for complete search history.

(56) References Cited

U.S. PATENT DOCUMENTS 8,582,638 B2 * 11/2013 Earnshaw ............. H04L 1/0026
375/240
8,588,323 B2 * 11/2013 Allpress ............... H04B 7/0413
375/260

(Continued)

FOREIGN PATENT DOCUMENTS

CN 101908951 A * 12/2010 ............. H04L 5/001
CN 102013954 A 4/2011

(Continued)

OTHER PUBLICATIONS

3GPP TS 36.213 V10.1.0 (Mar. 2011) Technical Specification 3rd Generation Partnership Project; Technical Specification Group Radio Access Network; Evolved Universal Terrestrial Radio Access (E-UTRA); Physical layer procedures (Release 10); pp. 1-4,60-68.*

(Continued)

*Primary Examiner* — Eric Nowlin
(74) *Attorney, Agent, or Firm* — Qualcomm/Norton Rose Fulbright US LLP

(57) ABSTRACT

A method transmits long term evolution (LTE) measurement reports on an uplink. The method manages invalid reference subframes in a multicarrier configuration. The managing can be implemented by transmitting measurement reports for component carriers with valid reference subframes; and omitting measurement reports for at least one component carrier with an invalid reference subframe.

34 Claims, 12 Drawing Sheets

(56) References Cited

U.S. PATENT DOCUMENTS

| | | | |
|---|---|---|---|
| 8,761,062 B2 * | 6/2014 | Chandrasekhar | H04W 24/10 370/310 |
| 8,934,350 B2 * | 1/2015 | Chen | H04L 1/0026 370/241 |
| 9,007,933 B2 * | 4/2015 | Wu | H04W 72/0406 370/252 |
| 9,014,024 B2 * | 4/2015 | Chen | H04W 24/10 370/252 |
| 9,144,040 B2 * | 9/2015 | Xiao | H04B 7/0447 |
| 9,161,153 B2 * | 10/2015 | Kuo | H04L 1/0029 |
| 9,184,818 B2 * | 11/2015 | Kim | H04B 7/024 |
| 9,209,882 B2 * | 12/2015 | Zhang | H04B 7/0486 |
| 9,226,272 B2 * | 12/2015 | Lee | H04L 1/0026 |
| 9,264,915 B2 * | 2/2016 | Seo | H04B 7/0626 |
| 9,271,279 B2 * | 2/2016 | Khoshnevis | H04W 72/0413 |
| 9,277,438 B2 * | 3/2016 | Chen | H04W 24/10 |
| 9,337,970 B2 * | 5/2016 | Hammarwall | H04L 1/0026 |
| 9,344,173 B2 * | 5/2016 | Kim | H04B 7/024 |
| 9,363,697 B2 * | 6/2016 | Lindoff | H04L 1/0026 |
| 9,401,796 B2 * | 7/2016 | Wu | H04W 72/0406 |
| 9,414,249 B2 * | 8/2016 | Hooli | H04L 1/0027 |
| 9,496,995 B2 * | 11/2016 | Kim | H04L 5/001 |
| 9,537,630 B2 * | 1/2017 | Lunttila | H04L 1/0023 |
| 9,538,521 B2 * | 1/2017 | Papasakellariou | H04W 72/042 |
| 9,603,040 B2 * | 3/2017 | Chandrasekhar | H04W 24/10 |
| 9,603,163 B2 * | 3/2017 | Yi | H04W 72/121 |
| 9,642,101 B2 * | 5/2017 | Xiao | H04B 7/0447 |
| 9,667,391 B2 * | 5/2017 | Lee | H04L 1/0026 |
| 9,680,522 B2 * | 6/2017 | Ekpenyong | H04B 1/56 |
| 9,680,581 B2 * | 6/2017 | Song | H04B 17/309 |
| 9,742,537 B2 * | 8/2017 | Suzuki | H04W 24/10 |
| 9,769,833 B2 * | 9/2017 | Van Lieshout | H04B 1/406 |
| 9,787,383 B2 * | 10/2017 | Seo | H04B 7/0626 |
| 9,854,593 B2 * | 12/2017 | Wu | H04W 72/0406 |
| 9,867,070 B2 * | 1/2018 | Luo | H04W 24/08 |
| 9,872,303 B2 * | 1/2018 | Suzuki | H04W 72/085 |
| 9,876,624 B2 * | 1/2018 | Suzuki | H04W 72/1226 |
| 9,900,068 B2 * | 2/2018 | Park | H04B 7/0469 |
| 9,906,340 B2 * | 2/2018 | Prasad | H04L 5/0035 |
| 9,912,430 B2 * | 3/2018 | Sayana | H04J 3/1694 |
| 9,979,455 B2 * | 5/2018 | Yi | H04W 76/16 |
| 9,986,454 B2 * | 5/2018 | Lee | H04W 24/08 |
| 2005/0232156 A1 * | 10/2005 | Kim et al. | 370/236 |
| 2010/0050039 A1 | 2/2010 | Zhang et al. | |
| 2010/0195748 A1 | 8/2010 | Nam et al. | |
| 2011/0142144 A1 * | 6/2011 | Allpress | H04B 7/0413 375/259 |
| 2011/0216676 A1 | 9/2011 | Li et al. | |
| 2011/0243007 A1 * | 10/2011 | Xiao | H04B 7/0447 370/252 |
| 2011/0249578 A1 * | 10/2011 | Nayeb Nazar et al. | 370/252 |
| 2011/0249643 A1 | 10/2011 | Barbieri et al. | |
| 2011/0250919 A1 | 10/2011 | Barbieri et al. | |
| 2011/0317652 A1 * | 12/2011 | Kim | H04L 5/001 370/329 |
| 2012/0076105 A1 * | 3/2012 | Yang et al. | 370/329 |
| 2012/0082049 A1 * | 4/2012 | Chen | H04W 24/10 370/252 |
| 2012/0120817 A1 * | 5/2012 | Khoshnevis et al. | 370/252 |
| 2012/0127869 A1 * | 5/2012 | Yin et al. | 370/252 |
| 2012/0134275 A1 * | 5/2012 | Choi et al. | 370/241 |
| 2012/0140649 A1 * | 6/2012 | Choudhury et al. | 370/252 |
| 2012/0140708 A1 * | 6/2012 | Choudhury et al. | 370/328 |
| 2012/0176924 A1 * | 7/2012 | Wu | H04W 72/0406 370/252 |
| 2012/0188955 A1 * | 7/2012 | Zhang | H04L 5/005 370/329 |
| 2012/0201154 A1 * | 8/2012 | Chandrasekhar | H04W 24/10 370/252 |
| 2012/0275398 A1 * | 11/2012 | Chen | H04W 24/10 370/329 |
| 2012/0300641 A1 * | 11/2012 | Chen | H04L 1/0026 370/241 |
| 2012/0327785 A1 * | 12/2012 | Zhang | H04B 7/0486 370/241 |
| 2013/0021980 A1 * | 1/2013 | Yang et al. | 370/328 |
| 2013/0142134 A1 * | 6/2013 | Zhu | H04L 5/001 370/329 |
| 2013/0208711 A1 * | 8/2013 | Van Lieshout | H04B 1/406 370/336 |
| 2013/0286933 A1 * | 10/2013 | Lee | H04L 1/0026 370/315 |
| 2013/0301465 A1 * | 11/2013 | Seo | H04B 7/0626 370/252 |
| 2013/0336244 A1 * | 12/2013 | Kuo | H04L 1/0029 370/329 |
| 2014/0010126 A1 * | 1/2014 | Sayana | H04J 3/1694 370/280 |
| 2014/0078990 A1 * | 3/2014 | Lee | H04L 1/0026 370/329 |
| 2014/0105055 A1 * | 4/2014 | Kang | H04W 24/10 370/252 |
| 2014/0112173 A1 * | 4/2014 | Hammarwall | H04L 1/0026 370/252 |
| 2014/0200020 A1 * | 7/2014 | Lindoff | H04L 1/0026 455/452.1 |
| 2014/0226612 A1 * | 8/2014 | Kim | H04B 7/024 370/329 |
| 2014/0241454 A1 * | 8/2014 | Kim | H04B 7/024 375/267 |
| 2014/0247798 A1 * | 9/2014 | Lunttila | H04L 1/0023 370/329 |
| 2014/0301231 A1 * | 10/2014 | Hooli | H04L 1/0027 370/252 |
| 2014/0321407 A1 * | 10/2014 | Seo | H04B 7/0626 370/329 |
| 2014/0334355 A1 * | 11/2014 | Ekpenyong | H04B 1/56 370/280 |
| 2014/0334391 A1 * | 11/2014 | Khoshnevis | H04W 72/0413 370/329 |
| 2015/0049689 A1 * | 2/2015 | Seo | H04L 5/005 370/329 |
| 2015/0172950 A1 * | 6/2015 | Chen | H04W 16/14 370/252 |
| 2015/0195734 A1 * | 7/2015 | Chen | H04W 24/10 370/252 |
| 2015/0208269 A1 * | 7/2015 | Damnjanovic | H04L 1/0026 370/252 |
| 2015/0229457 A1 * | 8/2015 | Wu | H04W 72/0406 370/329 |
| 2015/0245232 A1 * | 8/2015 | Luo | H04W 24/08 370/252 |
| 2015/0264669 A1 * | 9/2015 | Kim | H04L 5/0048 370/329 |
| 2015/0282208 A1 * | 10/2015 | Yi | H04W 72/121 370/329 |
| 2015/0327106 A1 * | 11/2015 | Lee | H04W 52/02 370/252 |
| 2015/0341092 A1 * | 11/2015 | Park | H04B 7/0469 370/329 |
| 2015/0351056 A1 * | 12/2015 | Xiao | H04B 7/0447 455/522 |
| 2015/0381255 A1 * | 12/2015 | Kuo | H04L 1/0029 370/329 |
| 2016/0050648 A1 * | 2/2016 | Seo | H04B 7/0626 370/329 |
| 2016/0142188 A1 * | 5/2016 | Suzuki | H04W 24/10 370/329 |
| 2016/0143044 A1 * | 5/2016 | Suzuki | H04W 72/1226 370/329 |
| 2016/0174096 A1 * | 6/2016 | Khoshnevis | H04W 72/0413 370/252 |
| 2016/0197687 A1 * | 7/2016 | Song | H04L 5/00 370/252 |
| 2016/0227424 A1 * | 8/2016 | Chen | H04W 24/08 |
| 2016/0233994 A1 * | 8/2016 | Prasad | H04L 5/0035 |
| 2016/0241434 A1 * | 8/2016 | Li | H04B 7/2656 |
| 2016/0242054 A1 * | 8/2016 | Lee | H04B 17/345 |
| 2016/0323902 A1 * | 11/2016 | Wu | H04W 72/0406 |

(56) References Cited

U.S. PATENT DOCUMENTS

| | | | |
|---|---|---|---|
| 2017/0012757 A1* | 1/2017 | Suzuki | H04W 72/1226 |
| 2017/0026159 A1* | 1/2017 | Kim | H04L 5/001 |
| 2017/0041059 A1* | 2/2017 | Yi | H04B 7/024 |
| 2017/0041905 A1* | 2/2017 | Chen | H04L 69/22 |
| 2017/0086207 A1* | 3/2017 | Yokomakura | H04W 24/10 |
| 2017/0170940 A1* | 6/2017 | Lee | H04L 5/0057 |
| 2017/0288725 A1* | 10/2017 | Ekpenyong | H04B 1/56 |
| 2017/0290053 A1* | 10/2017 | Hwang | H04W 76/10 |
| 2017/0366998 A1* | 12/2017 | Lee | H04W 8/22 |
| 2017/0367106 A1* | 12/2017 | Kim | H04W 72/1215 |
| 2018/0034528 A1* | 2/2018 | Seo | H04B 7/0626 |
| 2018/0070313 A1* | 3/2018 | Papasakellariou | H04W 72/042 |
| 2018/0097596 A1* | 4/2018 | Palanivelu | H04L 5/0005 |
| 2018/0103482 A1* | 4/2018 | Wu | H04W 72/085 |
| 2018/0145851 A1* | 5/2018 | Kusashima | H04L 25/0226 |

FOREIGN PATENT DOCUMENTS

| | | | |
|---|---|---|---|
| EP | 2230786 A1 * | 9/2010 | H04L 1/00 |
| EP | 2405599 A2 * | 1/2012 | H04L 5/001 |
| EP | 2405599 A4 * | 1/2016 | H04L 5/001 |
| EP | 2405599 B1 * | 7/2017 | |
| WO | WO 2010052566 A2 * | 5/2010 | |
| WO | WO-2010101409 A2 | 9/2010 | |
| WO | WO-2012149028 A1 | 11/2012 | |
| WO | WO-2015018079 A1 * | 2/2015 | H04W 36/0055 |

OTHER PUBLICATIONS

Samsung, R2-110344: 3GPP TSG-RAN2 #72bis, Scell activation and CSI; Jan. 21, 2011, 3GPP; pp. 1-3.*
Zhu et al., CN101908951A Machine Translation, Dec. 8, 2010.*
LG, R1-110089: 3GPP TSG RAN WG1 #63bis CQI Reference Resource Timing for LTE-A, Dublin, Ireland; Jan. 21, 2011, 3GPP; pp. 1-5.*
International Search Report and Written Opinion—PCT/US2012/035011—ISA/EPO—dated Jul. 12, 2012.
Qualcomm Incorporated: "Clarification of CSI feedback for deactivated CCs", 3GPP Draft; R1-111675 Clarification of CSI Feedback for Deactivated CCS, 3rd Generation Partnership Project (3GPP), Mobile Competence Centre ; 650, Route Des Lucioles ; F-06921 Sophia-Antipolis Cedex ; France, vol. RAN WG1, no. Barcelona, Spain; May 9, 2011, May 3, 2011 (May 3, 2011), XP050491297, [retrieved on May 3, 2011] the whole document.
Samsung: "CQI Reference Resource Timing for LTE-A", 3GPP Draft; R1-110089, 3rd Generation Partnership Project (3GPP), Mobile Competence Centre ; 650, Route Des Lucioles ; F-06921 Sophia-Antipolis Cedex. France, vol. RAN WG1, no. Dublin, Ireland; Jan. 17, 2011, Jan. 12, 2011 (Jan. 12, 2011), XP050490306, [retrieved on Jan. 12, 2011] section 1 Introduction section 7.2.3 Channel quality indicator (CQI) definition.
Samsung: "Details of CQI definition for LTE-A", 3GPP Draft; R1-106034, 3rd Generation Partnership Project (3GPP), Mobile Competence Centre ; 650, Route Des Lucioles ; F-06921 Sophia-Antipolis Cedex ; France, vol. RAN WG1, no. Jacksonville, USA; Nov. 15, 2010, Nov. 9, 2010 (Nov. 9, 2010), XP050466815, [retrieved on Nov. 9, 2010] section 1 Introduction section 3 CQI definition for Rel-10 section 7.2.3 Channel quality indicator (CQI) definition.
Samsung: "CQI Reference Resource Timing for LTE-A", 3GPP Draft; R1-110089, 3rd Generation Partnership Project (3GPP), Mobile Competence Centre ; 650, Route Des Lucioles ; F-06921 Sophia-Antipolis Cedex ; France, vol. RAN WG1, no. Dublin, Ireland; Jan. 17, 2011, Jan. 12, 2011 (Jan. 12, 2011), XP050490306, [retrieved on Jan. 12, 2011] section 1 Introduction section 7.2.3 Channel quality indicator (CQI) definition.
LG Electronics Inc.,"SCell activation and CSI[online]", 3GPP TSG-RAN WG2#72bis, R2-110344, URL:http://www.3gpp.org/ftp/tsg_ran/WG2_RL2/TSGR2_72bis/Docs/R2-110344.zip, Jan. 2011.
Motorola Mobility,"Remaining Details on CSI reporting for CA", 3GPP TSG-RAN WG1#64 R1-110874, URL:http://www.3gpp.org/ftp/tsg_ran/WG1_RL1/TSGR1_64/Docs/R1-110874.zip,Feb. 2011.
Panasonic: "CSI reporting and Carrier Aggregation", 3GPP TSG-RAN WG2 Meeting #73bis, R2-112282, Apr. 2011, pp. 1-2.
European Search Report—EP16192339—Search Authority—Munich—dated Dec. 9, 2016.
Qualcomm Incorporated: "CQI for CA," 3GPP Draft; R1-102745 CQI for CA, 3rd Generation Partnership Project (3GPP), Mobile Competence Centre ; 650, Route Des Lucioles ; F-06921 Sophia-Antipolis Cedex ; France, vol. RAN WG1, no. Montreal, Canada; May 10, 2010, May 4, 2010 (May 4, 2010), XP050419939, [retrieved on May 4, 2010], 3 pages.
RAN2: "LS on CSI reporting and SCell deactivation," 3GPP Draft; R1-111303(R2-112611), 3rd Generation Partnership Project (3GPP), Mobile Competence Centre ; 650, Route Des Lucioles ; F-06921 Sophia-Antipolis Cedex ; France, vol. RAN WG1, no. Barcelona, Spain; May 9, 2011, Apr. 19, 2011 (Apr. 19, 2011), XP050490987, [retrieved on Apr. 19, 2011].

* cited by examiner

SYSTEM AND METHOD FOR MANAGING INVALID REFERENCE SUBFRAMES FOR CHANNEL STATE INFORMATION FEEDBACK

CROSS REFERENCE TO RELATED APPLICATION

The present application claims the benefit of U.S. provisional patent application No. 61/480,284 filed Apr. 28, 2011, in the names of CHEN et al, the disclosure of which is expressly incorporated by reference herein in its entirety.

BACKGROUND

Field

Aspects of the present disclosure relate generally to wireless communication systems, and more particularly to invalid reference subframes in channel state information feedback in a carrier aggregation system.

Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

According to an aspect of the present disclosure, a method transmits LTE measurement reports on an uplink. The method manages invalid reference subframes in a multicarrier configuration. The managing can be implemented by transmitting measurement reports for component carriers with valid reference subframes; and omitting measurement reports for at least one component carrier with an invalid reference subframe.

In another aspect, an apparatus for transmitting LTE measurement reports on an uplink includes a memory and at least one processor coupled to the memory. The processor(s) is configured to manage invalid reference subframes in a multicarrier configuration.

In yet another aspect, an apparatus for transmitting LTE measurement reports on an uplink has means for transmitting measurement reports for component carriers with valid reference subframes. The apparatus also has means for omitting measurement reports for at least one component carrier with an invalid reference subframe.

In still another aspect, a computer program product for transmitting LTE measurement reports on an uplink comprises a non-transitory computer-readable medium having non-transitory program code recorded thereon. The program code includes program code to manage invalid reference subframes in a multicarrier configuration. Such program code may include program code to transmit measurement reports for component carriers with valid reference subframes; and program code to omit measurement reports for at least one component carrier with an invalid reference subframe.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
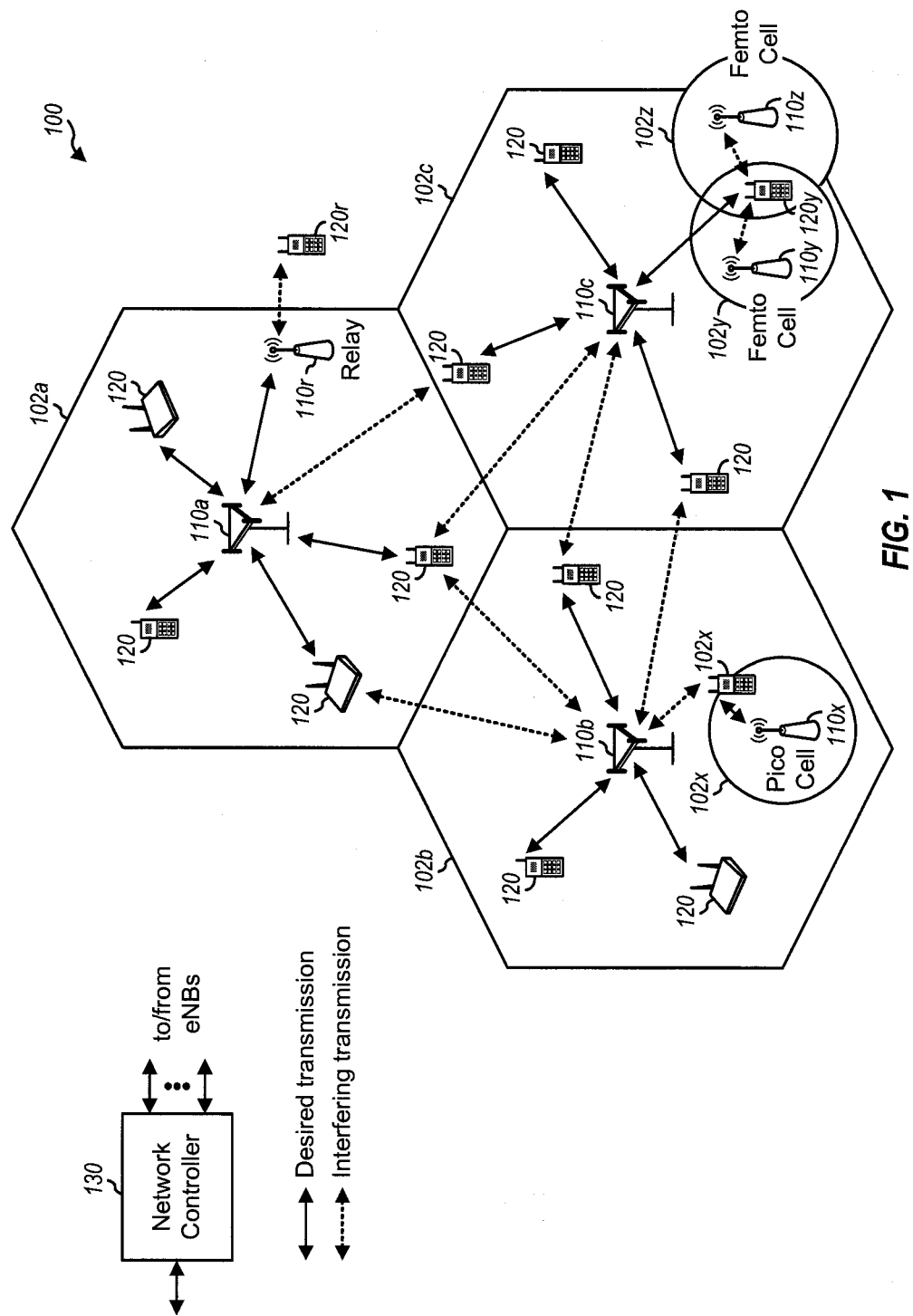
FIG. 1 is a block diagram conceptually illustrating an example of a telecommunications system in a telecommunications system.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

The techniques described herein may be used for various wireless communication networks such as CDMA, TDMA, FDMA, OFDMA, SC-FDMA and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

FIG. 1 shows a wireless communication network 100, which may be an LTE-A network. The wireless network 100 includes a number of evolved node Bs (eNodeBs) 110 and other network entities. An eNodeB may be a station that communicates with the UEs and may also be referred to as a base station, a node B, an access point, and the like. Each eNodeB 110 may provide communication coverage for a particular geographic area. In 3GPP, the term "cell" can refer to this particular geographic coverage area of an eNodeB and/or an eNodeB subsystem serving the coverage area, depending on the context in which the term is used.

An eNodeB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNodeB for a macro cell may be referred to as a macro eNodeB. An eNodeB for a pico cell may be referred to as a pico eNodeB. And, an eNodeB for a femto cell may be referred to as a femto eNodeB or a home eNodeB. In the example shown in FIG. 1, the eNodeBs 110*a*, 110*b* and 110*c* are macro eNodeBs for the macro cells 102*a*, 102*b* and 102*c*, respectively. The eNodeB 110*x* is a pico eNodeB for a pico cell 102*x*. And, the eNodeBs 110*y* and 110*z* are femto eNodeBs for the femto cells 102*y* and 102*z*, respectively. An eNodeB may support one or multiple (e.g., two, three, four, and the like) cells.

The wireless network 100 may also include relay stations. A relay station is a station that receives a transmission of data and/or other information from an upstream station (e.g., an eNodeB, UE, etc.) and sends a transmission of the data and/or other information to a downstream station (e.g., a UE or an eNodeB). A relay station may also be a UE that relays transmissions for other UEs. In the example shown in FIG. 1, a relay station 110*r* may communicate with the eNodeB 110a and a UE 120r in order to facilitate communication between the eNodeB 110a and the UE 120r. A relay station may also be referred to as a relay eNodeB, a relay, etc.

The wireless network 100 may be a heterogeneous network that includes eNodeBs of different types, e.g., macro eNodeBs, pico eNodeBs, femto eNodeBs, relays, etc. These different types of eNodeBs may have different transmit power levels, different coverage areas, and different impact on interference in the wireless network 100. For example, macro eNodeBs may have a high transmit power level (e.g., 20 Watts) whereas pico eNodeBs, femto eNodeBs and relays may have a lower transmit power level (e.g., 1 Watt).

The wireless network 100 may support synchronous or asynchronous operation. For synchronous operation, the eNodeBs may have similar frame timing, and transmissions from different eNodeBs may be approximately aligned in time. For asynchronous operation, the eNodeBs may have different frame timing, and transmissions from different eNodeBs may not be aligned in time. The techniques described herein may be used for either synchronous or asynchronous operations.

In one aspect, the wireless network 100 may support Frequency Division Duplex (FDD) or Time Division Duplex (TDD) modes of operation. The techniques described herein may be used for either FDD or TDD mode of operation.

A network controller 130 may couple to a set of eNodeBs 110 and provide coordination and control for these eNodeBs 110. The network controller 130 may communicate with the eNodeBs 110 via a backhaul. The eNodeBs 110 may also communicate with one another, e.g., directly or indirectly via a wireless backhaul or a wireline backhaul.

The UEs 120 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a laptop computer, a cordless phone, a wireless local loop (WLL) station, a tablet, or the like. A UE may be able to communicate with macro eNodeBs, pico eNodeBs, femto eNodeBs, relays, and the like. In FIG. 1, a solid line with double arrows indicates desired transmissions between a UE and a serving eNodeB, which is an eNodeB designated to serve the UE on the downlink and/or uplink. A dashed line with double arrows indicates interfering transmissions between a UE and an eNodeB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for a corresponding system bandwidth of 1.25, 2.5, 5, 10 or 20 megahertz (MHz), respectively. The system bandwidth may also be partitioned into sub-bands. For example, a sub-band may cover 1.08 MHz (i.e., 6 resource blocks), and there may be 1, 2, 3, 8 or 16 sub-bands for a corresponding system bandwidth of 1.25, 2.5, 5, 10, 15 or 20 MHz, respectively.

Figure 2:
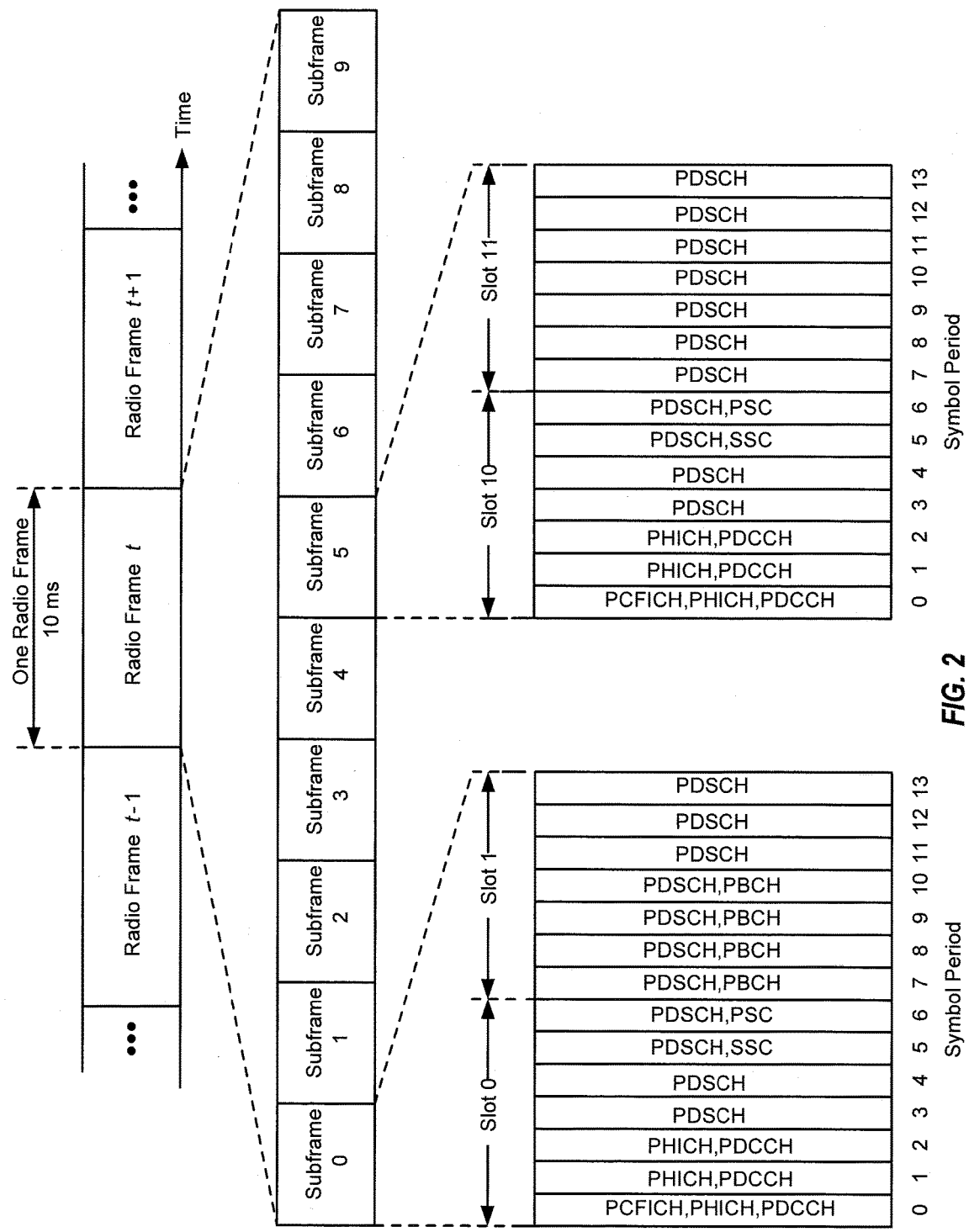
FIG. 2 is a diagram conceptually illustrating an example of a downlink frame structure in a telecommunications system.

FIG. 2 shows a downlink FDD frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNodeB may send a primary synchronization signal (PSC or PSS) and a secondary synchronization signal (SSC or SSS) for each cell in the eNodeB. For FDD mode of operation, the primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. For FDD mode of operation, the eNodeB may send a Physical Broadcast Channel (PBCH) in symbol periods 0 to 3 in slot 1 of subframe 0. The PBCH may carry certain system information.

The eNodeB may send a Physical Control Format Indicator Channel (PCFICH) in the first symbol period of each subframe, as seen in FIG. 2. The PCFICH may convey the number of symbol periods (M) used for control channels, where M may be equal to 1, 2 or 3 and may change from subframe to subframe. M may also be equal to 3 for a small system bandwidth, e.g., with less than 10 resource blocks. In the example shown in FIG. 2, M=3. The eNodeB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 2. The PHICH may carry information to support hybrid automatic retransmission (HARQ). The PDCCH may carry information on uplink and downlink resource allocation for UEs and power control information for uplink channels. The eNodeB may send a Physical Downlink Shared Channel (PDSCH) in the remaining symbol periods of each subframe. The PDSCH may carry data for UEs scheduled for data transmission on the downlink.

The eNodeB may send the PSC, SSC and PBCH in the center 1.08 MHz of the system bandwidth used by the eNodeB. The eNodeB may send the PCFICH and PHICH across the entire system bandwidth in each symbol period in which these channels are sent. The eNodeB may send the PDCCH to groups of UEs in certain portions of the system bandwidth. The eNodeB may send the PDSCH to groups of UEs in specific portions of the system bandwidth. The eNodeB may send the PSC, SSC, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. For symbols that are used for control channels, the resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 36 or 72 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for all UEs in the PDCCH. An eNodeB may send the PDCCH to the UE in any of the combinations that the UE will search.

A UE may be within the coverage of multiple eNodeBs. One of these eNodeBs may be selected to serve the UE. The serving eNodeB may be selected based on various criteria such as received power, path loss, signal-to-noise ratio (SNR), etc.

Figure 3:
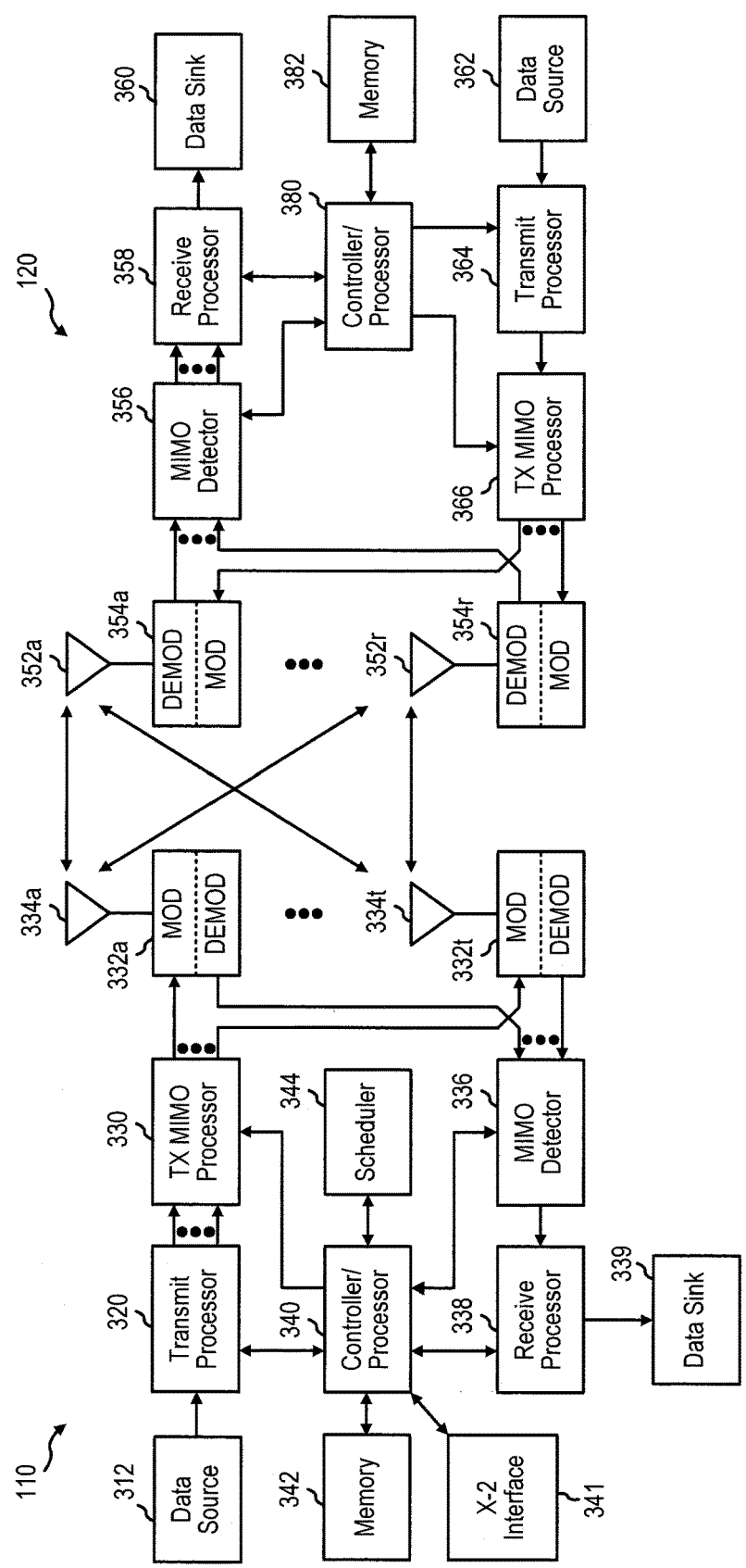
FIG. 3 is a block diagram conceptually illustrating a design of a base station/eNodeB and a UE configured according to one aspect of the present disclosure.

FIG. 3 shows a block diagram of a design of a base station/eNodeB 110 and a UE 120, which may be one of the base stations/eNodeBs and one of the UEs in FIG. 1. The base station 110 may be the macro eNodeB 110c in FIG. 1, and the UE 120 may be the UE 120y. The base station 110 may also be a base station of some other type. The base station 110 may be equipped with antennas 334a through 334t, and the UE 120 may be equipped with antennas 352a through 352r.

At the base station 110, a transmit processor 320 may receive data from a data source 312 and control information from a controller/processor 340. The control information may be for the PBCH, PCFICH, PHICH, PDCCH, etc. The data may be for the PDSCH, etc. The processor 320 may process (e.g., encode and symbol map) the data and control information to obtain data symbols and control symbols, respectively. The processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. Downlink signals from modulators 332a through 332t may be transmitted via the antennas 334a through 334t, respectively.

At the UE 120, the antennas 352a through 352r may receive the downlink signals from the base station 110 and may provide received signals to the demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all the demodulators 354a through 354r, perform MIMO detection on the received symbols if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The processor 364 may also generate reference symbols for a reference signal. The symbols from the transmit processor 364 may be precoded by a TX MIMO processor 366 if applicable, further processed by the modulators 354a through 354r (e.g., for SC-FDM, etc.), and transmitted to the base station 110. At the base station 110, the uplink signals from the UE 120 may be received by the antennas 334, processed by the demodulators 332, detected by a MIMO detector 336 if applicable, and further processed by a receive processor 338 to obtain decoded data and control information sent by the UE 120. The processor 338 may provide the decoded data to a data sink 339 and the decoded control information to the controller/processor 340. The base station 110 can send messages to other base stations, for example, over an X2 interface 341.

The controllers/processors 340 and 380 may direct the operation at the base station 110 and the UE 120, respectively. The processor 340 and/or other processors and modules at the base station 110 may perform or direct the execution of various processes for the techniques described herein. The processor 380 and/or other processors and modules at the UE 120 may also perform or direct the execution of the functional blocks illustrated in use FIG. 7, and/or other processes for the techniques described herein. The memories 342 and 382 may store data and program codes for the base station 110 and the UE 120, respectively. A scheduler 344 may schedule UEs for data transmission on the downlink and/or uplink.

Carrier Aggregation

LTE-Advanced UEs use spectrum in up to 20 MHz bandwidths allocated in a carrier aggregation of up to a total of 100 MHz (5 component carriers) used for transmission in each direction. A carrier may also be referred to as a component carrier (CC), a cell, etc. The terms "carrier", "CC", and "cell" are used interchangeably herein. A carrier used for the downlink may be referred to as a downlink CC, and a carrier used for the uplink may be referred to as an uplink CC. An eNB may transmit data and control information on one or more downlink CCs to a UE. The UE may transmit data and control information on one or more uplink CCs to the eNB. Generally, less traffic is transmitted on the uplink than the downlink, so the uplink spectrum allocation may be smaller than the downlink allocation. For example, if 20 MHz is assigned to the uplink, the downlink may be assigned 100 Mhz. These asymmetric FDD assignments will conserve spectrum and are a good fit for the typically asymmetric bandwidth utilization by broadband subscribers.

Carrier Aggregation Types

Figure 4A:
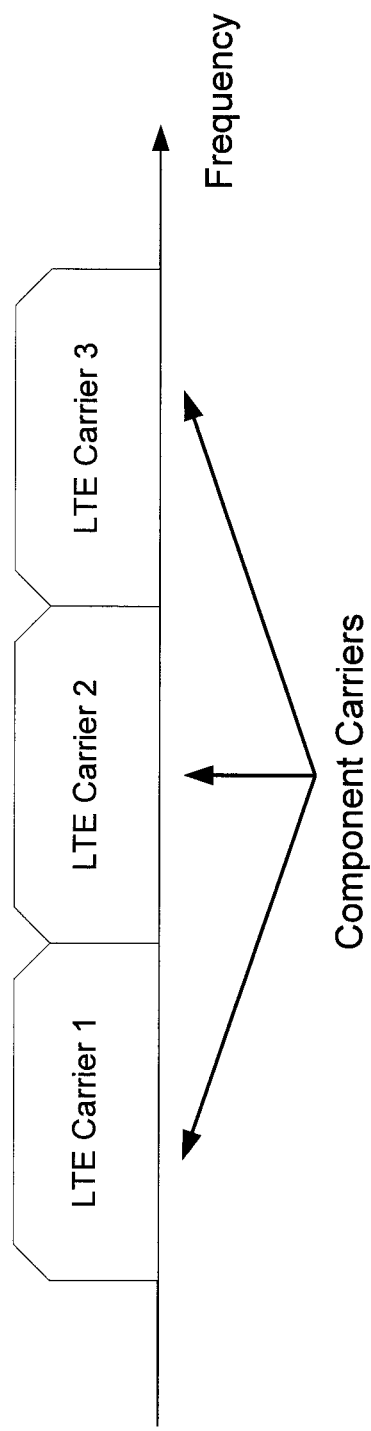
FIG. 4A discloses a continuous carrier aggregation type.
Figure 4B:
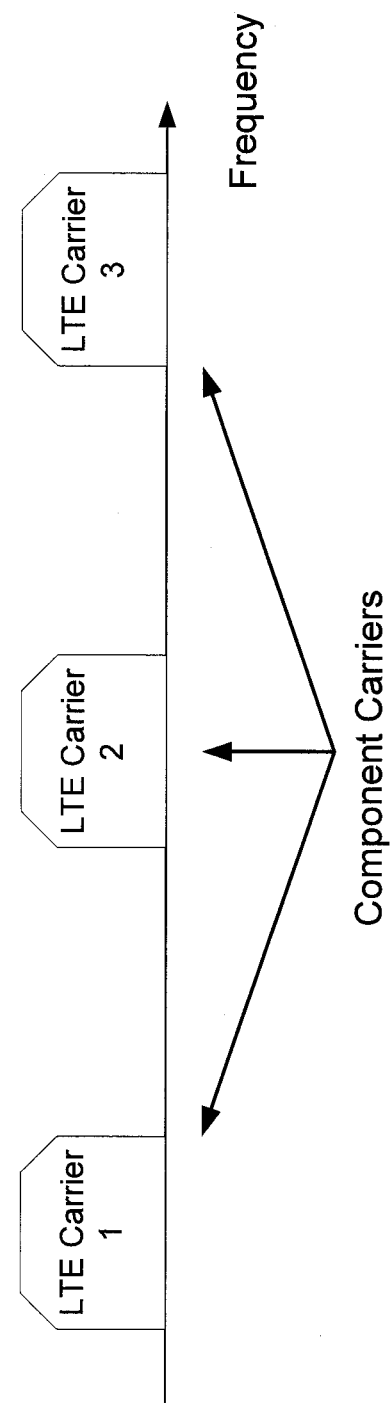
FIG. 4B discloses a non-continuous carrier aggregation type.

For the LTE-Advanced mobile systems, two types of carrier aggregation (CA) methods have been proposed, continuous CA and non-continuous CA. They are illustrated in FIGS. 4A and 4B. Non-continuous CA occurs when multiple available component carriers are separated along the frequency band (FIG. 4B). On the other hand, continuous CA occurs when multiple available component carriers are adjacent to each other (FIG. 4A). Both non-continuous and continuous CA aggregate multiple LTE/component carriers to serve a single unit of LTE Advanced UE.

Multiple RF receiving units and multiple FFTs may be deployed with non-continuous CA in LTE-Advanced UE since the carriers are separated along the frequency band. Because non-continuous CA supports data transmissions over multiple separated carriers across a large frequency range, propagation path loss, Doppler shift and other radio channel characteristics may vary a lot at different frequency bands.

Thus, to support broadband data transmission under the non-continuous CA approach, methods may be used to adaptively adjust coding, modulation and transmission power for different component carriers. For example, in an LTE-Advanced system where the enhanced NodeB (eNodeB) has fixed transmitting power on each component carrier, the effective coverage or supportable modulation and coding of each component carrier may be different.

Data Aggregation Schemes

Figure 5:
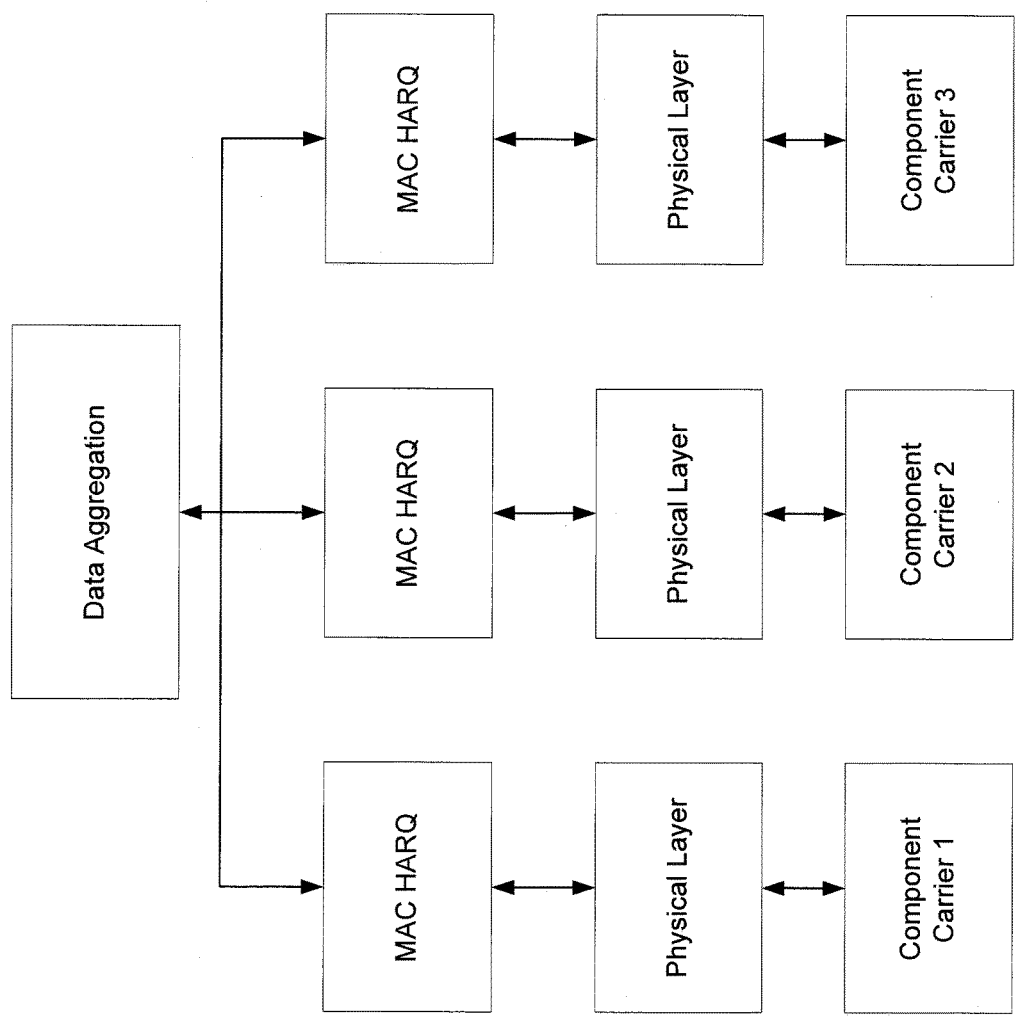
FIG. 5 discloses MAC layer data aggregation.

FIG. 5 illustrates aggregating transmission blocks (TBs) from different component carriers at the medium access control (MAC) layer (FIG. 5) for an IMT-Advanced system. With MAC layer data aggregation, each component carrier has its own independent hybrid automatic repeat request (HARQ) entity in the MAC layer and its own transmission configuration parameters (e.g., transmitting power, modulation and coding schemes, and multiple antenna configuration) in the physical layer. Similarly, in the physical layer, one HARQ entity is provided for each component carrier.

Control Signaling

In general, there are three different approaches for deploying control channel signaling for multiple component carriers. The first involves a minor modification of the control structure in LTE systems where each component carrier is given its own coded control channel.

The second method involves jointly coding the control channels of different component carriers and deploying the control channels in a dedicated component carrier. The control information for the multiple component carriers will be integrated as the signaling content in this dedicated control channel. As a result, backward compatibility with the control channel structure in LTE systems is maintained, while signaling overhead in the CA is reduced.

Multiple control channels for different component carriers are jointly coded and then transmitted over the entire frequency band formed by a third CA method. This approach offers low signaling overhead and high decoding performance in control channels, at the expense of high power consumption at the UE side. However, this method is not compatible with LTE systems.

Handover Control

It is preferable to support transmission continuity during the handover procedure across multiple cells when CA is used for IMT-Advanced UE. However, reserving sufficient system resources (i.e., component carriers with good transmission quality) for the incoming UE with specific CA configurations and quality of service (QoS) requirements may be challenging for the next eNodeB. The reason is that the channel conditions of two (or more) adjacent cells (eNodeBs) may be different for the specific UE. In one approach, the UE measures the performance of only one component carrier in each adjacent cell. This offers similar measurement delay, complexity, and energy consumption as that in LTE systems. An estimate of the performance of the other component carriers in the corresponding cell may be based on the measurement result of the one component carrier. Based on this estimate, the handover decision and transmission configuration may be determined.

According to various examples, the UE operating in a multicarrier system (also referred to as carrier aggregation) is configured to aggregate certain functions of multiple carriers, such as control and feedback functions, on the same carrier, which may be referred to as a "primary component carrier" (PCC). The remaining carriers that depend on the primary carrier for support are referred to as associated secondary component carriers (SCC). For example, the UE may aggregate control functions such as those provided by the optional dedicated channel (DCH), the nonscheduled grants, a physical uplink control channel (PUCCH), and/or a physical downlink control channel (PDCCH). Signaling and payload may be transmitted both on the downlink by the eNode B to the UE, and on the uplink by the UE to the eNodeB.

In some examples, there may be multiple primary carriers. In addition, secondary carriers may be added or removed without affecting the basic operation of the UE, including physical channel establishment and RLF procedures which are layer 2 and layer 3 procedures, such as in the 3GPP technical specification 36.331 for the LTE RRC protocol.

Figure 6:
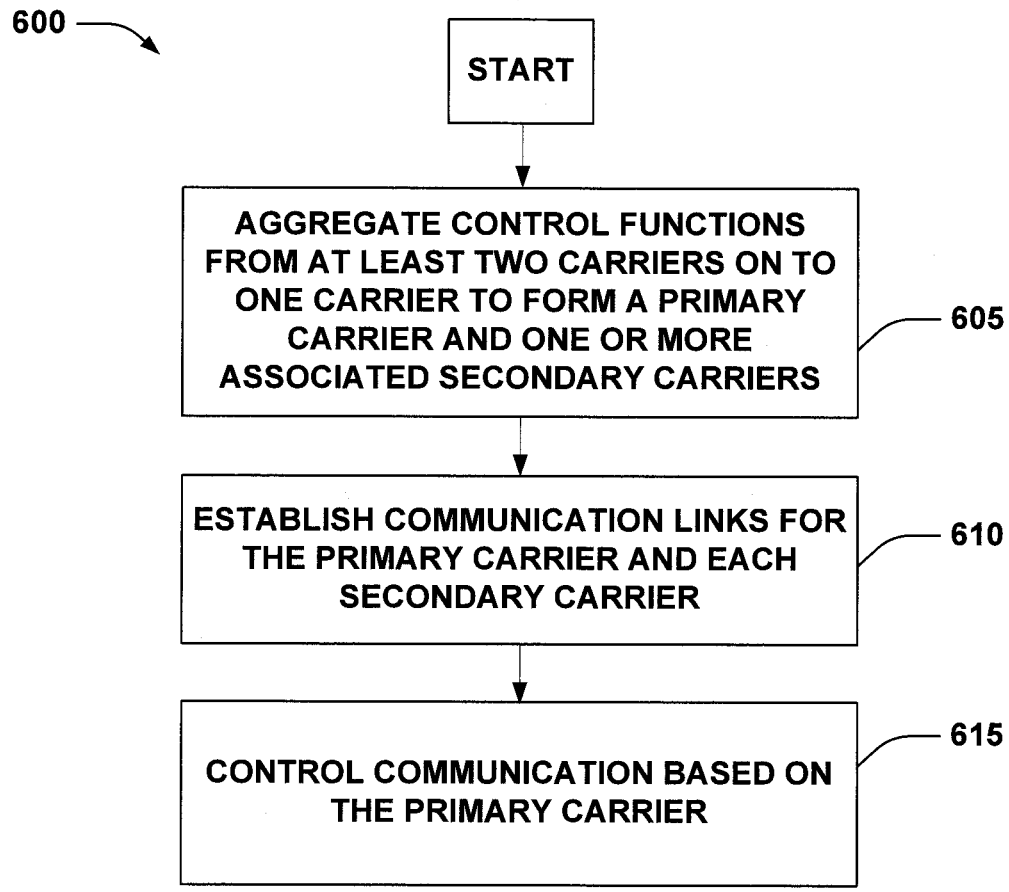
FIG. 6 is a block diagram illustrating a method for controlling radio links in multiple carrier configurations.

FIG. 6 illustrates a method 600 for controlling radio links in a multiple carrier wireless communication system by grouping physical channels according to one example. As shown, the method includes, at block 605, aggregating control functions from at least two carriers onto one carrier to form a primary carrier and one or more associated secondary carriers. Next, at block 610, communication links are established for the primary carrier and each secondary carrier. Then, communication is controlled based on the primary carrier in block 615.

Channel State Information (CSI) Reference Subframes

LTE-Advanced (LTE-A) is part of Release 10 of the 3GPP specification. In LTE-A, a UE may be configured with multiple component carriers (CCs). As discussed earlier, one component carrier is designated as the primary component carrier (PCC), while the other CCs are designated secondary component carriers (SCC). In a multicarrier system, the primary component carrier may be semi-statically configured by higher layers for each UE, i.e., infrequently updated. The present patent application discloses a method and apparatus for transmitting measurement reports on an uplink (UL) for long term evolution-advanced (LTE-A) using carrier aggregation. In one example, the UE transmits reports using an uplink control channel such as a physical uplink control channel (PUCCH). The reports transmitted on the uplink may include channel quality indicators (CQI), precoding matrix indicators (PMI), rank indicators (RI), hybrid automatic repeat request (HARD), acknowledgement (ACK/NACK), channel status reports (CQI/PMI/RI), source routing (SR) and sounding reference signals (SRS). For different reporting types, the PUCCH carries different indicators In a multicarrier system, the primary component carrier may be semi-statically configured by higher layers for each UE. When acknowledge and/or negative acknowledge (ACK/NAK), channel quality indicator (CQI), and scheduling request (SR) messages are transmitted on the physical uplink control channel (PUCCH), the messages are transmitted on the primary component carrier.

Figure 7:
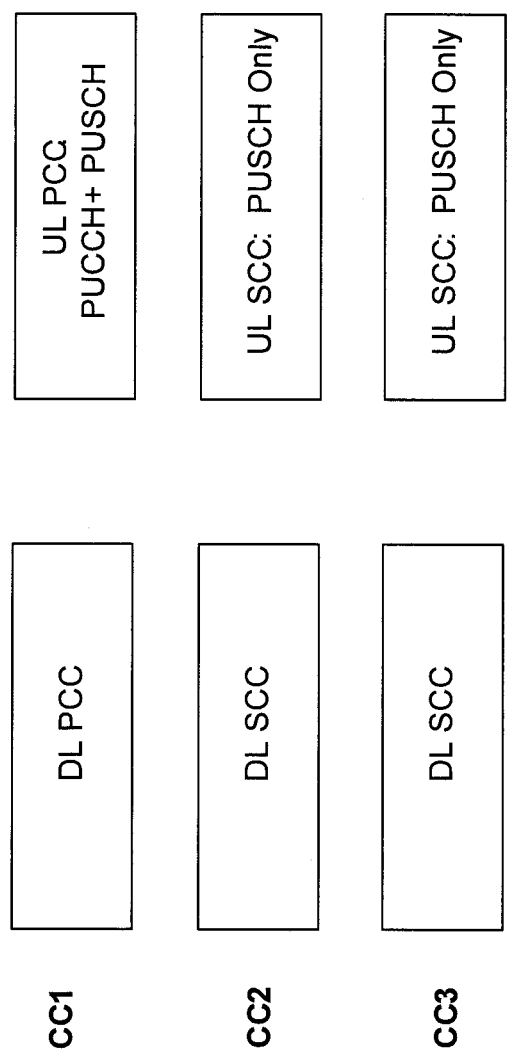
FIG. 7 illustrates the UL PCC carried on the PUCCH and the PUSCH, while the UL SCC is carried on the PUSCH.

As seen in FIG. 7, the uplink PCC may carry the PUCCH and the PUSCH, while the uplink SCC may carry the PUSCH only. Also, up to a 5:1 downlink (DL) to uplink (UL) CC mapping is possible. For example, one uplink CC may support ACK/NAK transmission on a physical uplink control channel (PUCCH) for up to 5 downlink CCs.

Figure 8:
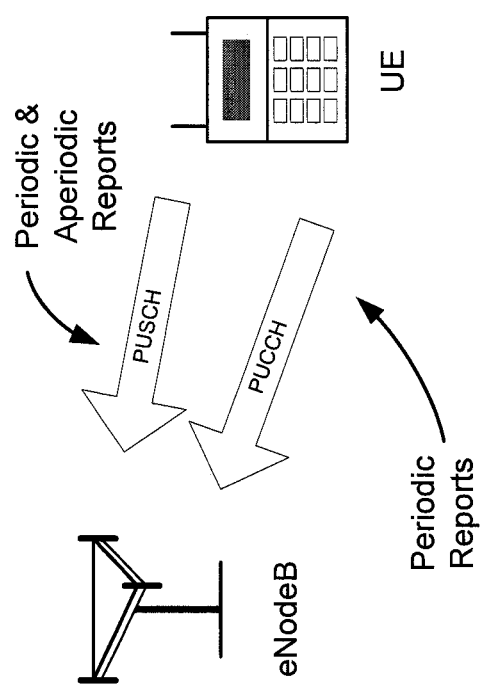
FIG. 8 illustrates both aperiodic and periodic reports being transmitted on the PUSCH, while only periodic reports are transmitted on the PUCCH.

The UE may be configured to report measurement information that may be used to control the UE. LTE supports both periodic and aperiodic (or event triggered) reporting of channel state information (CSI), e.g., CQI, PMI (precoding matrix indicator), PTI (precoding type indicator), and RI (rank indicator). Periodic reporting of CSI occurs for only one downlink component carrier in one subframe. Both aperiodic and periodic reports are transmitted on the PUSCH, while only periodic reports are transmitted on the PUCCH, as seen in FIG. 8.

In one example, the particular downlink component carrier is selected according to a priority. Component carriers may be prioritized based on a reporting type. The first or top priority is given to reporting types 3, 5, 6 and 2a. Second priority is given to types 2, 2b, 2c and 4. Third priority is given to types 1, and 1a. If the reporting type/mode is the same, CC priorities are set by RRC-configuration. The same priority rules apply to the case without physical uplink shared channel (PUSCH) and the case with PUSCH. Reporting for other non-selected downlink component carriers is dropped. For the determined downlink CC, the same Rel-8 procedure in case of collision between RI, Wideband CQI/PMI, Subband CQI for the same CC applies. In another example, the periodic CSI reporting may be for two or more component carriers in a subframe. Similarly, in this case, component carriers may be prioritized based on a reporting type.

In a system configured for carrier aggregation, the aperiodic channel state information (CSI) is more flexible than periodic CSI feedback. For aperiodic CSI feedback, RRC (radio resource control) messaging can configure any combination of up to five component carriers. If carrier aggregation is configured, the aperiodic CSI request field contains 2 bits. The values for the two bits are:

"00" state indicates no CSI is triggered "01" state indicates a trigger for the DL CC that is SIB2-linked to the UL CC transmitting the CSI report.

"10" indicates the PUCCH is configured by the RRC

"11" indicates the PUCCH is configured by the RRC

For the common search space, one bit is used where the "0" state indicates that no CSI is triggered, and the "1" state indicates that the PUCCH is configured by the RRC. The RRC can configure any combination of up to five component carriers.

In LTE-A, data signals and reference signals are transmitted in one of nine transmission modes. Each channel state information report is measured based on a particular reference resource (in frequency and time). For example, for transmission mode 9, the channel measurement is based on the CSI-RS (channel state information-reference signal). For other transmission modes, the channel measurement is based on a common reference signal (CRS). The nine transmission modes in LTE-A are:

Mode 1: Single Antenna Port, Port 0
Mode 2: Transmit Diversity
Mode 3: Large-Delay CDD
Mode 4: Closed Loop Spatial Multiplexing
Mode 5: MU-MIMO
Mode 6: Closed Loop Spatial Multiplexing, Single Layer
Mode 7: Single Antenna Port, UE-Specific RS (PORT 5)
Mode 8: Single or Dual-Layer Transmission With UE-Specific RS (Ports 7 and/or 8)
Mode 9: Multi-Layer Transmission Mode From a time perspective, for a channel quality information (CQI) report in subframe n, the reference resource is defined by a single downlink subframe, "n-$n_{CQI\_ref}$." For periodic CQI reporting, "n-$n_{CQI\_ref}$" is the smallest value greater than or equal to four (4), such that it corresponds to a valid downlink subframe. For aperiodic CQI reporting, "$n_{CQI\_ref}$" is typically the reference resource in the same valid downlink subframe as the corresponding CQI request in a downlink control information (DCI) format for uplink transmissions. Additionally, for aperiodic CQI reporting triggered by a Random Access Response Grant, "$n_{CQI\_ref}$" equals 4 and the downlink subframe "n-$n_{CQI\_ref}$" corresponds to a valid downlink subframe, where downlink subframe "n-$n_{CQI\_ref}$" is received after the subframe with the corresponding CQI request in a Random Access Response (RAR) grant.

A downlink reference subframe is considered valid if it is configured as a downlink subframe for a particular UE. The downlink subframe is valid when it is not an MBSFN (multimedia broadcast single frequency network) subframe (except for transmission mode 9), it does not contain a special subframe field (e.g., DwPTS (downlink pilot time slot)) with three symbols or less, and it does not fall within a configured measurement gap for that UE. To be valid, the subframe should also fall outside of transition times for secondary component carrier activation and deactivation, and fall outside of the deactivated duration of a secondary component carrier. For periodic CSI reporting associated with CSI-RS, a valid subframe should be an element of the CSI subframe set linked to the periodic CSI report when that UE is configured with CSI subframe sets. If there is no valid downlink subframe for the CQI reference resource, CQI reporting is omitted in the associated uplink subframe.

It is unclear how to "omit" reports when multiple component carriers are enabled and one of the component carriers has a valid reference subframe while another component carrier has an invalid reference subframe. Invalid subframes may result from many factors. For example, the reference subframe may not be a downlink subframe when one component carrier (CC) is frequency division duplexed (FDD) and another component carrier is time division duplexed (TDD), and the triggering requests reporting for both component carriers. As another example, it is unclear how to report when two TDD component carriers are of different downlink and uplink configurations. Additionally, the subframe may be invalid when component carriers are not aligned. For example, the subframe may be a multimedia broadcast single frequency network (MBSFN) subframe, special subframe with three symbols or less, or fall into a measurement gap for one component carrier but not the other. Further, a subframe may be invalid if a secondary component carrier is deactivated and also shortly (e.g., 0-8 ms) after the secondary component carrier is activated.

Figure 9:
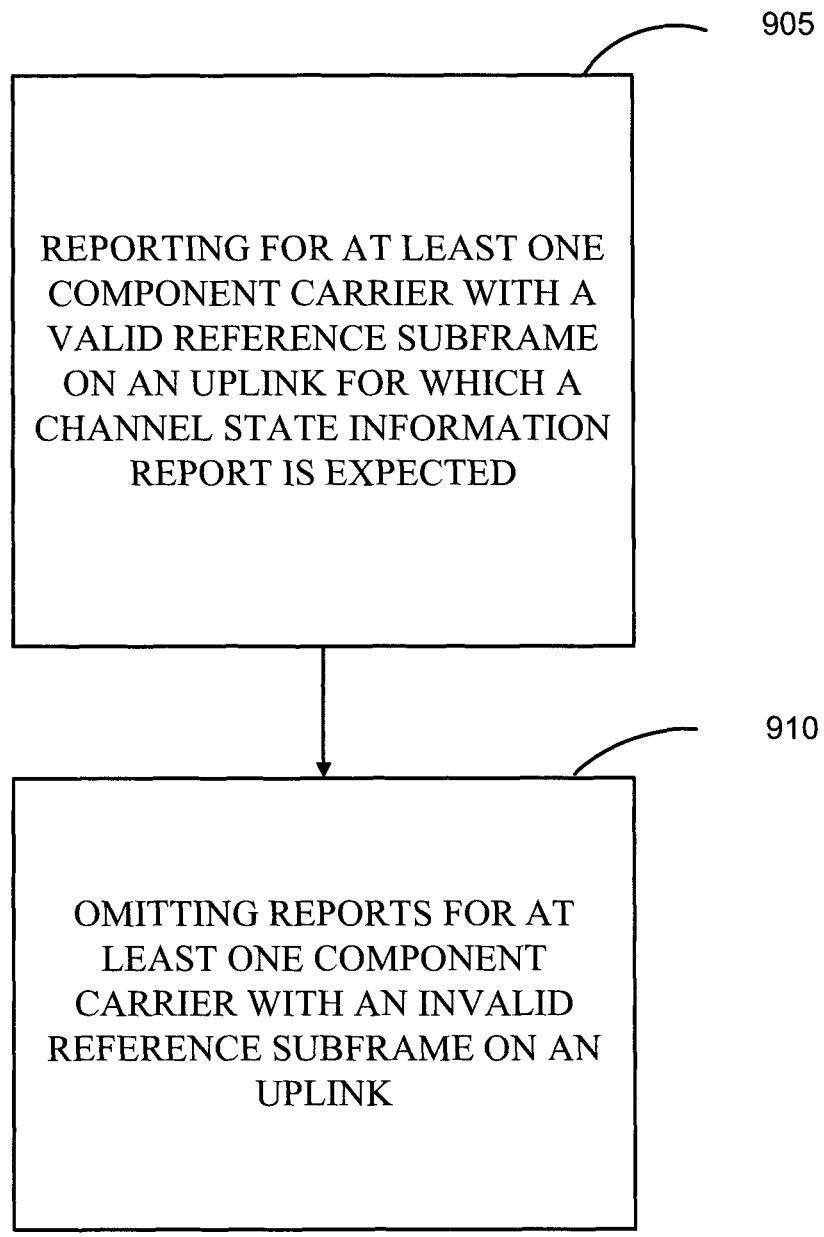
FIG. 9 is a block diagram illustrating a method for managing invalid downlink reference subframes by omitting reports.

Various designs may be implemented to manage invalid reference subframes. In one aspect, channel state information reports are selectively omitted. In particular, for component carriers with invalid reference subframes, a channel state information report is not sent. An example is now described with respect to FIG. 9. A UE may be configured to report for a first component carrier (CC1), a second component carrier (CC2) and/or a third component carrier (CC3) at block 905. Once the UE is triggered to send the report, if it is determined that CC1 and CC2 have invalid reference subframes while CC3 has a valid reference subframe, then the UE may report only for CC3, while omitting the CC1 and CC2 reports at block 910.

In another aspect, if at least one component carrier has an invalid reference subframe, the reporting for all component carriers may be omitted, rather than omitting reports only for the component carriers with invalid reference subframes. Additionally, in another aspect, when all of the component carriers have invalid subframes, the UE may omit the reporting entirely, or treat it as an error event. Omitting reporting for component carriers with invalid reference subframes reduces uplink overhead.

Figure 10:
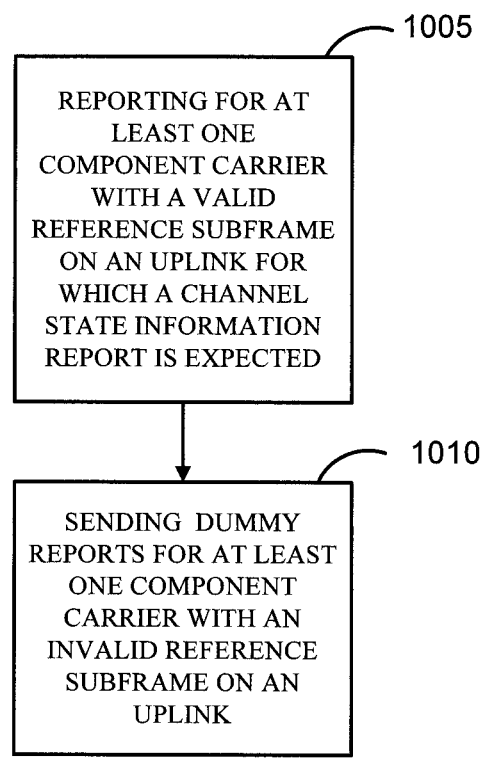
FIG. 10 is a block diagram illustrating a method for managing invalid downlink reference subframes using dummy reports.

In another aspect, dummy reporting may be utilized. In particular, for component carriers with invalid reference subframes, the channel state information (CSI) report is transmitted with dummy information. An example is now described with respect to FIG. 10. A UE is configured to report for CC1, CC2, and CC3 and is triggered to send the report at block 1005. In this example, CC1 and CC2 have invalid reference subframes, while CC3 has a valid reference subframe. At block 1010, the UE reports for CC1, CC2, and CC3, with the CC1 and CC2 reports being "dummy" reports (e.g., CQI=0 (out of range) while the precoding matrix indicator (PMI) and the rank indicator (RI) can be unspecified). Dummy reporting allows for fixed channel state information reporting and avoids potential misalignment between an eNodeB and UE.

Yet another aspect utilizes semi-static selective report omission. For those component carriers with invalid reference subframes, if the invalidity is semi-static and/or static in nature, then the channel state information (CSI) report is omitted. For example, if the invalidity is due to special subframes, MBSFN configuration, availability of downlink subframes, etc., then the CSI report is omitted. Otherwise, a dummy report is transmitted. For example, if the invalidity is due to component carrier activation/deactivation, then a dummy report is transmitted (e.g., out of range). In another example, a UE is configured to report for CC1, CC2, and CC3 and is triggered to send the report. CC1 and CC2 have invalid reference subframes while CC3 has valid reference subframes. The CC1 invalidity is due to a MBSFN subframe and the CC2 invalidity is due to activation/deactivation. A report is sent for CC3, a dummy report is sent for CC2, and the CC1 report is omitted. Selective semi-static omission promotes uplink overhead efficiency and reduces or even minimizes misalignment between the eNodeB and the UE. In another example, the entire channel state information report for all component carriers is omitted if there is at least one component carrier with an invalid reference subframe that is semi-static in nature.

As noted above, the periodic channel state information report is different from the aperiodic channel state information report. In particular, the periodic channel state information report refers to a valid subframe 4 ms or earlier. Additionally, in LTE Release 10, for each periodic report, the report is for only one component carrier in a subframe, rather than multiple component carriers. In another example, it is possible that periodic CSI reporting may occur for two or more component carriers in one subframe. As a result, the periodic channel state information reporting may be treated differently from the aperiodic channel state information reporting. In particular, in one aspect, a report for a component carrier may be omitted if the component carrier is deactivated. In another aspect, a dummy report is generated for a deactivated component carrier.

Different types of reports (e.g., periodic and aperiodic) may be handled in different ways. For example, for periodic reporting, the reports for a deactivated component carrier can be omitted. For aperiodic reporting, the reports for a deactivated component carrier can be transmitted as a dummy report (e.g., a dummy value such as CQI=0 or out of range).

In another aspect, prioritization of component carriers with invalid references that collide with component carriers with valid reference subframes is considered. In one configuration, the component carriers with invalid references are still part of the prioritization, regardless of whether the CSI report is to occur. In another configuration, those component carriers having invalid reference subframes are not considered in the prioritization comparison, regardless of whether the CSI report is to occur. In yet another configuration, component carriers having invalid reference subframes are part of the prioritization only if dummy reporting is enabled; otherwise, those component carriers with invalid references are not considered in the priority comparison.

Figure 11:
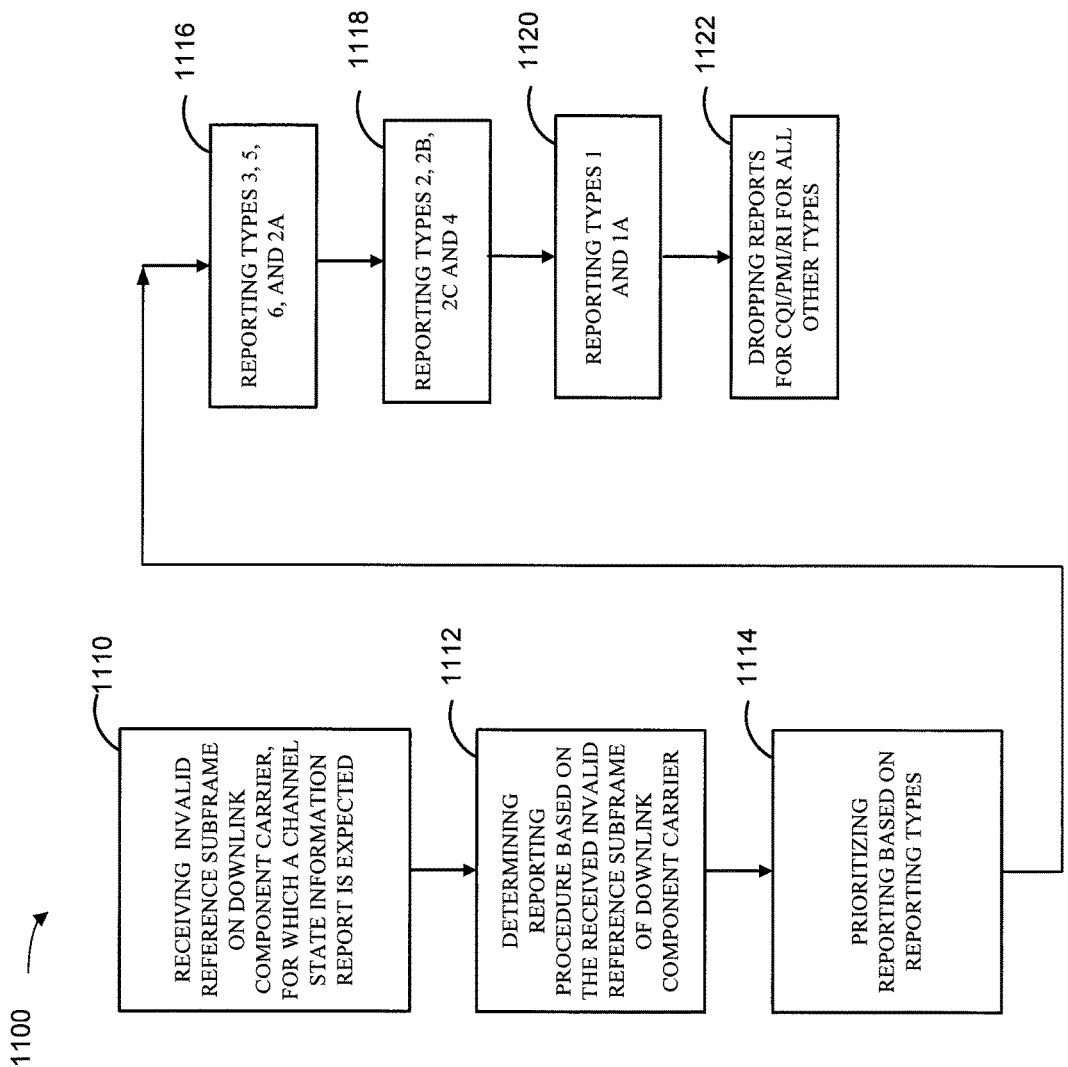
FIG. 11 is a block diagram illustrating a method for managing invalid downlink reference subframes when reporting.

FIG. 11 illustrates a method 1100 for managing invalid reference subframes for channel state information feedback in a carrier aggregation system. In block 1110, a UE receives an invalid reference subframe on a downlink component carrier, where a channel state information report is expected. The UE determines a reporting procedure based on the received invalid reference subframe of the downlink component carrier in block 1112.

In one example, component carriers may be prioritized based on a reporting type at block 1114. The first or top priority is given to reporting types 3, 5, 6 and 2a in block 1116. Second priority is given to types 2, 2b, 2c and 4 in block 1118. Third priority is given to types 1, and 1a in block 1120. Reporting is dropped for all other types in block 1122.

In one configuration, the UE 120 is configured for wireless communication including means for transmitting measurement reports for component carriers with valid reference subframes. In one aspect, the transmitting means may be the controller/processor 380, memory 382, transmit processor 364, and/or antenna 352a-352r configured to perform the functions recited by the receiving means. The UE 120 is also configured to include means for omitting measurement reports for at least one component carrier with an invalid reference subframe. In one aspect, the determining means may be the controller/processor 380 and/or memory 382 configured to perform the functions recited by the omitting means. In another aspect, the aforementioned means may be any module or any apparatus configured to perform the functions recited by the aforementioned means.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for transmitting measurement reports on an uplink, comprising:
   configuring, at a user equipment (UE), to send the measurement reports for multiple component carriers in one subframe in a multicarrier configuration;
   determining, at the UE, a validity of reference subframes for each of the multiple component carriers; and
   managing, at the UE, in response to said determining the validity of the reference subframes for each of the multiple component carriers, the sending of the measurement reports for the multiple component carriers in the one subframe in the multicarrier configuration, wherein managing the sending of the measurement reports for the multiple component carriers comprises:
   determining, at the UE, that at least one of the multiple component carriers has a valid reference subframe and that at least one of the multiple component carriers has an invalid reference subframe; and
   omitting, by the UE, in response to the determining that at least one of the multiple component carriers has the valid reference subframe and that at least one of the multiple component carriers has the invalid reference subframe, the sending of measurement reports for each of the multiple component carriers respectively when at least one of the multiple component carriers has the invalid reference subframe and when at least one of the multiple component carriers has the valid reference subframe.

2. The method according to claim 1, wherein the measurement reports are periodic channel state information (CSI) reports.

3. The method of claim 1, wherein the measurement reports are aperiodic channel state information (CSI) reports.

4. The method of claim 3, wherein transmitting the aperiodic CSI reports comprises transmitting on a physical uplink shared channel (PUSCH).

5. The method of claim 4, wherein transmitting the aperiodic CSI reports comprises transmitting on the PUSCH without uplink data.

6. The method of claim 4, wherein transmitting the aperiodic CSI reports comprises transmitting on the PUSCH with uplink data.

7. The method of claim 1, wherein omitting the sending of measurement reports for component carriers with an invalid reference subframe comprises:
   omitting the sending of measurement reports for at least one component carrier when the invalidity for the at least one component carrier is semi-static or static; and
   transmitting a dummy report when the invalidity is not semi-static or static.

8. The method according to claim 1, wherein managing the sending of the measurement reports for the multiple component carriers comprises:
   sending dummy information for at least one component carrier with an invalid reference subframe.

9. The method according to claim 1, wherein the invalid reference subframe comprises:
   a subframe within a measurement gap,
   a multimedia broadcast single frequency network (MBSFN) subframe,
   a subframe containing a downlink pilot time slot (DwPTS) with a duration less than three symbols, or
   a subframe within an activation transition period or deactivation transition period or a deactivated period.

10. The method according to claim 1, wherein managing the sending of the measurement reports for the multiple component carriers comprises:
    transmitting a dummy periodic report when a component carrier is deactivated.

11. An apparatus for transmitting measurement reports on an uplink, comprising:
    a memory; and
    at least one processor coupled to the memory, the at least one processor being configured to:

send the measurement reports for multiple component carriers in one subframe in a multicarrier configuration;
determine a validity of reference subframes for each of the multiple component carriers; and
manage, in response to said determining the validity of reference subframes for each of the multiple component carriers, the sending of the measurement reports for the multiple component carriers in the one subframe in the multicarrier configuration, wherein the at least one processor is further configured to manage the sending of the measurement reports for the multiple component carriers by:
determining, at the UE, that at least one of the multiple component carriers has a valid reference subframe and that at least one of the multiple component carriers has an invalid reference subframe; and
omitting, by the UE, in response to the determining that at least one of the multiple component carriers has the valid reference subframe and that at least one of the multiple component carriers has the invalid reference subframe, the sending of measurement reports for each of the multiple component carriers respectively when at least one of the multiple component carriers has the invalid reference subframe and when at least one of the multiple component carriers has the valid reference subframe.

12. The apparatus according to claim 11, wherein the measurement reports are periodic channel state information (CSI) reports.

13. The apparatus of claim 11, wherein the measurement reports are aperiodic channel state information (CSI) reports.

14. The apparatus of claim 13, wherein the at least one processor is further configured to transmit the aperiodic CSI reports by transmitting on a physical uplink shared channel (PUSCH).

15. The apparatus of claim 14, wherein the at least one processor is further configured to transmit the aperiodic CSI reports by transmitting on the PUSCH without uplink data.

16. The apparatus of claim 14, wherein the at least one processor is further configured to transmit the aperiodic CSI reports by transmitting on the PUSCH with uplink data.

17. The apparatus of claim 11, wherein the at least one processor is further configured to omit the sending of measurement reports for component carriers with an invalid reference subframe by:
omitting the sending of measurement reports for at least one component carrier when the invalidity for the at least one component carrier is semi-static or static; and
transmitting a dummy report when the invalidity is not semi-static or static.

18. The apparatus according to claim 11, wherein the at least one processor is further configured to manage the sending of the measurement reports for the multiple component carriers by:
sending dummy information for at least one component carrier with an invalid reference subframe.

19. The apparatus according to claim 11, wherein the invalid reference subframe comprises:
a subframe within a measurement gap,
a multimedia broadcast single frequency network (MBSFN) subframe,
a subframe containing a downlink pilot time slot (DwPTS) with a duration less than three symbols, or
a subframe within an activation transition period or deactivation transition period or a deactivated period.

20. The apparatus according to claim 11, wherein the at least one processor is further configured to manage the sending of the measurement reports for the multiple component carriers by transmitting a dummy periodic report when a component carrier is deactivated.

21. An apparatus for transmitting measurement reports on an uplink, comprising:
means for configuring, at a user equipment (UE), to send the measurement reports for multiple component carriers in one subframe in a multicarrier configuration;
means for determining, at the UE, a validity of reference subframes for each of the multiple component carriers;
means for managing, at the UE, in response to said means for determining the validity of the reference subframes for each of the multiple component carriers, the sending of the measurement reports for the multiple component carriers in the one subframe in the multicarrier configuration, wherein means for managing the sending of the measurement reports for the multiple component carriers comprise:
means for determining, at the UE, that at least one of the multiple component carriers has a valid reference subframe and that at least one of the multiple component carriers has an invalid reference subframe; and
means for omitting, by the UE, in response to the determining that at least one of the multiple component carriers has the valid reference subframe and that at least one of the multiple component carriers has the invalid reference subframe, the sending of measurement reports for each of the multiple component carriers respectively when at least one of the multiple component carriers has the invalid reference subframe and when at least one of the multiple component carriers has the valid reference subframe.

22. A computer program product for transmitting measurement reports on an uplink, comprising:
a non-transitory computer-readable medium having non-transitory program code recorded thereon, the program code comprising:
program code to configure, at a user equipment (UE), to send the measurement reports for multiple component carriers in one subframe in a multicarrier configuration;
program code to determining, at the UE, a validity of reference subframes for each of the multiple component carriers; and
program code to manage, in response to said determination of the validity of reference subframes for each of the multiple component carriers, the sending of the measurement reports for the multiple component carriers in the one subframe in the multicarrier configuration, wherein the program code to manage the sending of the measurement reports for the multiple component carriers comprises:
program code to determine, at the UE, that at least one of the multiple component carriers has a valid reference subframe and that at least one of the multiple component carriers has an invalid reference subframe;
and
program code to omit, by the UE, in response to the determining that at least one of the multiple component carriers has the valid reference subframe and that at least one of the multiple component carriers has the invalid reference subframe, the sending of measurement reports for each of the multiple component carriers respectively when at least one of the multiple component carriers has the invalid reference subframe and when at least one of the multiple component carriers has the valid reference subframe.

23. A method for measurement reports on an uplink, comprising:
configuring, at a user equipment (UE), to send the measurement reports for component carriers in a multicarrier configuration;
determining, at the UE, a validity of reference subframes; and
managing, at the UE, in response to said determining the validity of reference subframes, invalid reference subframes in the multicarrier configuration by:
transmitting measurement reports for component carriers with valid reference subframes; and
omitting measurement reports for at least one component carrier with an invalid reference subframe, wherein the measurement reports are periodic channel state information (CSI) reports,
wherein transmitting the measurement reports comprises transmitting the periodic CSI reports for only one component carrier in a subframe, wherein prioritization among component carriers with the periodic CSI reports due in a same subframe is based at least in part on a report type for each component carrier, where:
reporting types 3, 5, 6 and 2 have a highest priority;
reporting types 2, 2b, 2c, and 4 are prioritized when types 3, 5, 6 and 2a are reported; and
reporting types 1 and 1a are prioritized when types 2, 2b, 2c and 4 are reported.

24. The method of claim 23, wherein the measurement reports are omitted for deactivated component carriers and prioritization is performed only within activated component carriers.

25. The method of claim 23, wherein prioritization is further based on a higher layer configuration when at least two component carriers have a same reporting type.

26. The method according to claim 23, wherein transmitting the periodic measurement reports comprises transmitting the periodic CSI reports for at least two component carriers in a subframe, wherein prioritization among component carriers with the periodic CSI reports due in the same subframe is based at least in part on a report type for each component carrier.

27. The method of claim 23, wherein transmitting the measurement reports comprises transmitting the periodic CSI reports on a physical uplink control channel (PUCCH) or a physical uplink shared channel (PUSCH).

28. An apparatus for transmitting measurement reports on an uplink, comprising:
a memory; and
at least one processor coupled to the memory, the at least one processor being configured to:
send the measurement reports for component carriers in a multicarrier configuration;
determine a validity of reference subframes; and
manage, in response to said determining the validity of reference subframes, invalid reference subframes in the multicarrier configuration by:
transmitting measurement reports for component carriers with valid reference subframes; and
omitting measurement reports for at least one component carrier with an invalid reference subframe, wherein the measurement reports are periodic channel state information (CSI) reports, and
wherein the at least one processor is further configured to transmit the measurement reports by transmitting the periodic CSI reports for only one component carrier in a subframe, wherein prioritization among component carriers with the periodic CSI reports due in a same subframe is based at least in part on a report type for each component carrier, where:
reporting types 3, 5, 6 and 2 have a highest priority;
reporting types 2, 2b, 2c, and 4 are prioritized when types 3, 5, 6 and 2a are reported; and
reporting types 1 and 1a are prioritized when types 2, 2b, 2c and 4 are reported.

29. The apparatus of claim 28, wherein the measurement reports are omitted for deactivated component carriers and prioritization is performed only within activated component carriers.

30. The apparatus of claim 28, wherein prioritization is further based on a higher layer configuration when at least two component carriers have a same reporting type.

31. The apparatus according to claim 28, wherein the at least one processor is further configured to transmit the measurement reports by transmitting the periodic CSI reports for at least two component carriers in a subframe, wherein prioritization among component carriers with the periodic CSI reports due in the same subframe is based at least in part on a report type for each component carrier.

32. The apparatus of claim 28, wherein the at least one processor is further configured to transmit the measurement reports by transmitting the periodic channel state information reports on a physical uplink control channel (PUCCH) or a physical uplink shared channel (PUSCH).

33. An apparatus for transmitting measurement reports on an uplink, comprising:
means for configuring, at a user equipment (UE), to send the measurement reports for component carriers in a multicarrier configuration;
means for determining, at the UE, a validity of reference subframes; and
means for managing, at the UE, in response to said determining the validity of reference subframes, invalid reference subframes in the multicarrier configuration, wherein the means for managing include:
means for transmitting measurement reports for component carriers with valid reference subframes; and
means for omitting measurement reports for at least one component carrier with an invalid reference subframe, wherein the measurement reports are periodic channel state information (CSI) reports, wherein the means for transmitting the periodic measurement reports comprises means for transmitting the periodic CSI reports for only one component carrier in a subframe, wherein prioritization among component carriers with the periodic CSI reports due in a same subframe is based at least in part on a report type for each component carrier, where:
reporting types 3, 5, 6 and 2 have a highest priority;
reporting types 2, 2b, 2c, and 4 are prioritized when types 3, 5, 6 and 2a are reported; and
reporting types 1 and 1a are prioritized when types 2, 2b, 2c and 4 are reported.

34. A computer program product for transmitting measurement reports on an uplink, comprising:
a non-transitory computer-readable medium having non-transitory program code recorded thereon, the program code comprising:

program code to configure, at a user equipment (UE), to send the measurement reports for component carriers in a multicarrier configuration;

program code to determine, at the UE, a validity of reference subframes; and program code to manage, at the UE, in response to said determining the validity of reference subframes, invalid reference subframes in the multicarrier configuration, wherein the program code to manage includes:

program code to transmit measurement reports for component carriers with valid reference subframes; and program code to omit measurement reports for at least one component carrier with an invalid reference subframe, wherein the measurement reports are periodic channel state information (CSI) reports, wherein the program code to transmit the periodic measurement reports includes program code to transmit the periodic CSI reports for only one component carrier in a subframe, wherein prioritization among component carriers with the periodic CSI reports due in a same subframe is based at least in part on a report type for each component carrier, where:

reporting types 3, 5, 6 and 2 have a highest priority;

reporting types 2, 2b, 2c, and 4 are prioritized when types 3, 5, 6 and 2a are reported; and reporting types 1 and 1a are prioritized when types 2, 2b, 2c and 4 are reported.

\* \* \* \* \*